US010889498B2

(12) United States Patent
Yamaguchi

(10) Patent No.: US 10,889,498 B2
(45) Date of Patent: Jan. 12, 2021

(54) DRAWING DEVICE AND DRAWING METHOD

(71) Applicant: LINTEC CORPORATION, Tokyo (JP)

(72) Inventor: Kazuhisa Yamaguchi, Tokyo (JP)

(73) Assignee: LINTEC CORPORATION, Tokyo (JP)

(*) Notice: Subject to any disclaimer, the term of this patent is extended or adjusted under 35 U.S.C. 154(b) by 267 days.

(21) Appl. No.: 16/067,799

(22) PCT Filed: Dec. 22, 2016

(86) PCT No.: PCT/JP2016/088280
§ 371 (c)(1),
(2) Date: Jul. 2, 2018

(87) PCT Pub. No.: WO2017/119308
PCT Pub. Date: Jul. 13, 2017

(65) Prior Publication Data
US 2019/0002287 A1 Jan. 3, 2019

(30) Foreign Application Priority Data
Jan. 5, 2016 (JP) .................................. 2016-000678

(51) Int. Cl.
C01B 32/16 (2017.01)
C01B 32/158 (2017.01)
(Continued)

(52) U.S. Cl.
CPC .......... *C01B 32/158* (2017.08); *B82B 3/0057* (2013.01); *C01B 32/168* (2017.08);
(Continued)

(58) Field of Classification Search
CPC ........................... C01B 32/158; C01B 32/168
See application file for complete search history.

(56) References Cited

U.S. PATENT DOCUMENTS

| 2007/0036709 A1* | 2/2007 | Lashmore | D01F 9/127 |
| | | | 423/447.1 |
| 2009/0087543 A1* | 4/2009 | Nicholas | B82Y 30/00 |
| | | | 427/10 |

(Continued)

FOREIGN PATENT DOCUMENTS

| JP | 2009-184908 A | 8/2009 |
| WO | 2013/021797 A1 | 2/2013 |

OTHER PUBLICATIONS

Miao, M., "Yarn spun from carbon nanotube forests: Production, structure, properties and applications," Particuology, Elsevier, Amsterdam, NL, vol. 11, Issue No. 4, Feb. 28, 2013, pp. 378-393, XP028568663.

(Continued)

*Primary Examiner* — Joseph A Miller, Jr.
(74) *Attorney, Agent, or Firm* — McDermott Will & Emery LLP

(57) ABSTRACT

A drawing apparatus, which draws carbon nanotubes from a grown form produced by growing carbon nanotubes, includes a holder for holding a part of the grown form by a holding member and a drive unit for causing a relative movement of the grown form and the holder. The holder includes a winding unit for winding a part of the grown form around the holding member.

5 Claims, 3 Drawing Sheets

(51) Int. Cl.
*B82B 3/00* (2006.01)
*D02J 1/22* (2006.01)
*C01B 32/168* (2017.01)
*B82Y 30/00* (2011.01)
*B82Y 40/00* (2011.01)

(52) U.S. Cl.
CPC ............... *D02J 1/22* (2013.01); *B82Y 30/00* (2013.01); *B82Y 40/00* (2013.01)

(56) References Cited

U.S. PATENT DOCUMENTS

| | | | |
|---|---|---|---|
| 2009/0196981 A1 | 8/2009 | Liu et al. | |
| 2009/0208742 A1* | 8/2009 | Zhu | D02G 3/36 428/367 |
| 2011/0020210 A1* | 1/2011 | Liu | B82B 3/00 423/447.1 |
| 2011/0117316 A1* | 5/2011 | Lemaire | C01B 32/162 428/113 |
| 2013/0146215 A1* | 6/2013 | Liu | C01B 32/168 156/193 |
| 2014/0217643 A1* | 8/2014 | Nikawa | C01B 32/158 264/299 |
| 2016/0229113 A1* | 8/2016 | Ovalle | C01B 32/168 |
| 2017/0335492 A1* | 11/2017 | Wang | C01B 32/168 |

OTHER PUBLICATIONS

Extended European Search Report issued in European Application No. 16883807.6, dated Aug. 1, 2019.
Office Action issued in corresponding Japanese Patent Application No. 2016-000678, dated Sep. 3, 2019, with English translation.
Office Action issued in corresponding Japanese Patent Application No. 2016-000679, dated Sep. 3, 2019, with English translation.
International Search Report issued in corresponding International Patent Application No. PCT/JP2016/088280, dated Mar. 21, 2017.

* cited by examiner

DRAWING DEVICE AND DRAWING METHOD

CROSS REFERENCE

This application is the U.S. National Phase under 35 U.S.C. § 371 of International Application No. PCT/JP2016/088280, filed on Dec. 22, 2016, which claims the benefit of Japanese Application No. 2016-000678, filed on Jan. 5, 2016, the entire contents of each are hereby incorporated by reference.

TECHNICAL FIELD

The present invention relates to a drawing apparatus and a drawing method.

BACKGROUND ART

A typically known drawing apparatus is configured to hold and draw a part of a grown form, which is produced by growing carbon nanotubes, using a tool (holding member) such as tweezers and tape to form carbon nanotube film (extended form) (see, for instance, Patent Literature 1).

CITATION LIST

Patent Literature(s)

Patent Literature 1: JP 2009-184908 A

SUMMARY OF THE INVENTION

Problem(s) to be Solved by the Invention

However, since the grown form is occasionally approximately several hundreds of micrometers thick, the typical drawing apparatus as disclosed in Patent Literature 1 cannot hold an end of the grown form with the holding member, thus failing to produce the extended form.

An object of the invention is to provide a drawing apparatus and a drawing method capable of reliably holding a part of a grown form to produce an extended form.

Means for Solving the Problem(s)

A drawing apparatus according to an aspect of the invention is for drawing an extended form from a grown form produced by growing carbon nanotubes, the drawing apparatus including: a holder configured to hold a part of the grown form with a holding member; and a drive unit configured to cause a relative movement of the grown form and the holding member, where the holder comprises a winding unit configured to wind a part of the grown form around the holding member.

In the drawing apparatus according to the above aspect of the invention, it is preferable that the holder is configured to wind the part of the grown form around the holding member by rotating the holding member around an axis in a direction orthogonal to a drawing direction of the extended form.

A method according to another aspect of the invention is for drawing an extended form from a grown form produced by growing carbon nanotubes, the method including: holding a part of the grown form with a holding member; and causing a relative movement of the grown form and the holding member, where the holding of the grown form includes winding the part of the grown form around the holding member.

According to the above aspects of the invention, since a part of the grown form is wound on the holding member to be held, the part of the grown form can be reliably held in forming the extended form.

Further, when the holding member is rotated around an axis orthogonal to the drawing direction of the extended form, the extended form can be reliably held in drawing the extended form from the grown form.

BRIEF DESCRIPTION OF DRAWING(S)

DESCRIPTION OF EMBODIMENT(S)

An exemplary embodiment of the invention will be described below with reference to attached drawings.

It should be noted that X-axis, Y-axis and Z-axis in the exemplary embodiment are orthogonal to each other, where the X-axis and Y-axis are within a predetermined plane while the Z-axis is orthogonal to the predetermined plane. Further, in the exemplary embodiment, when a direction is indicated with reference to FIG. 1A as viewed from a near side, which is parallel to the Y-axis, an "upper" direction means a direction indicated by an arrow along the Z-axis, a "lower" direction means a direction opposite the upper direction, a "right" direction means a direction indicated by an arrow along the X-axis, a "left" direction means a direction opposite the "right" direction, a "front" direction means a direction toward the near side in FIG. 1A in parallel to the Y-axis, and a "rear" direction means a direction opposite the "front" direction.

Figure 1A:
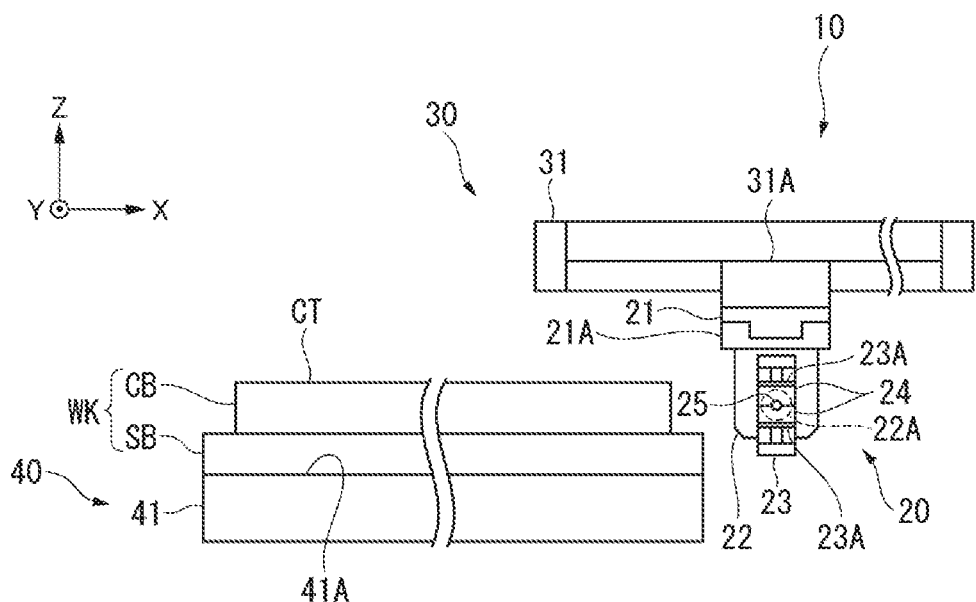
FIG. 1A is a side elevational view showing a drawing apparatus according to an exemplary embodiment of the invention.
Figure 1B:
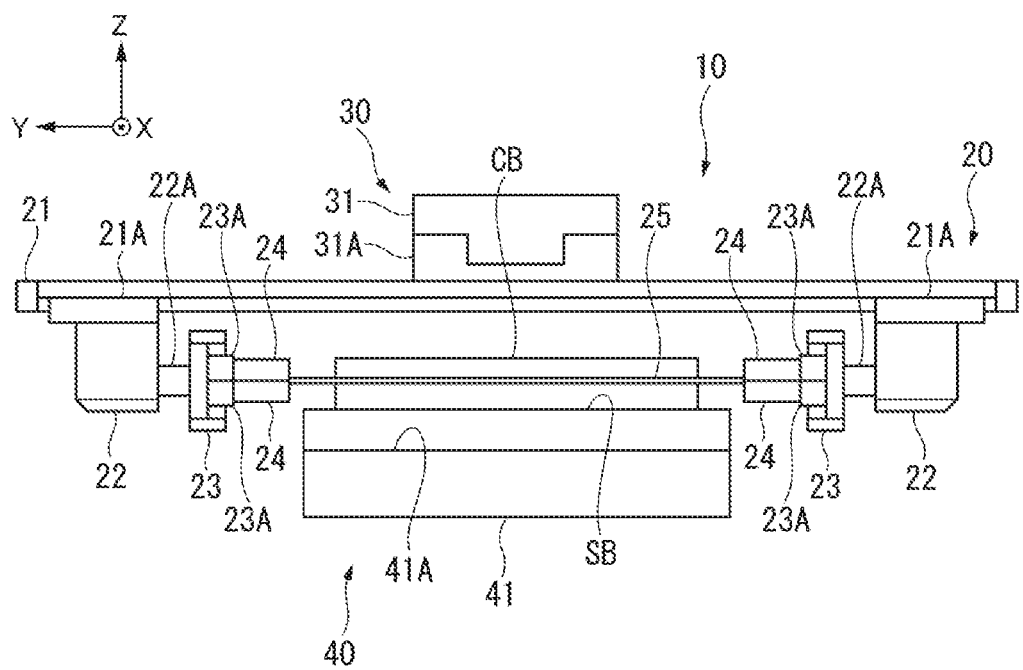
FIG. 1B is a side elevational view showing the drawing apparatus according to the exemplary embodiment of the invention.

A drawing apparatus 10 shown in FIGS. 1A and 1B is configured to draw a carbon nanotube sheet CS (extended form) (sometimes simply referred to as a "sheet CS" hereinafter) from a grown form CB produced by growing carbon nanotubes CT. The drawing apparatus 10 includes a holder 20 for holding a part of the grown form CB using a wire rod 25 (holding member), and a drive unit 30 for relatively moving the grown form CB and the wire rod 25 and is provided near a grown-form support 40 for supporting the grown form CB. It should be noted that the grown form CB is produced by growing the carbon nanotubes CT in an upper direction from a first side of the substrate SB and is in a form of an integrated workpiece WK supported by the substrate SB.

The holder 20 includes: a linear motor 21 (a tension-applying unit; drive device) including a pair of sliders 21A;

rotary motors 22 (each being a winding unit configured to wind a part of the grown form CB on the wire rod 25; drive device) each supported by corresponding one of the pair of sliders 21A; linear motors 23 (drive device) each including a slider 23A and supported by an output shaft 22A of corresponding one of the rotary motors 22, the linear motors 23 each being configured to support corresponding one of chuck members 24 with the slider 23A; and the wire rod 25 supported by the chuck members 24. The holder 20 is configured to wind a part of the grown form CB on the wire rod 25 by rotating the wire rod 25 around an axis in a direction (front-rear direction) orthogonal to the drawing direction (right direction) of the sheet CS.

The drive unit 30 includes a linear motor 31 (drive device) having a slider 31A for supporting a linear motor 21.

The grown-form support 40 includes a table 41 having a holding surface 41A for sucking and holding the integrated workpiece WK from a second side of the substrate SB using a decompressor (not shown) such as a decompression pump and vacuum ejector.

A process for drawing the sheet CS from the grown form CB using the above drawing apparatus 10 will be described below.

Initially, a signal for starting an automatic operation is inputted to the drawing apparatus 10 shown in FIGS. 1A and 1B, whose components are set at initial positions, by an operator using an input device (not shown) such as an operation panel and personal computer. Then, the holder 20 drives the linear motor 21 to move the pair of sliders 21A in directions away from each other to apply tension on the wire rod 25 (standby state). Subsequently, after the integrated workpiece WK is placed at a predetermined position on the holding surface 41A by an operator or a non-illustrated transfer device, the grown-form support 40 drives the non-illustrated decompressor to suck and hold the integrated workpiece WK on the holding surface 41A.

Figure 2A:
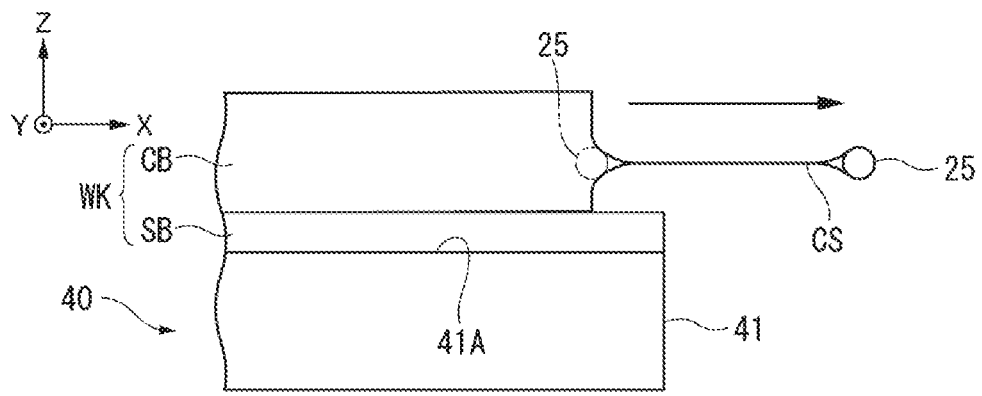
FIG. 2A is an illustration showing an operation of the drawing apparatus shown in FIGS. 1A and 1B.

Then, the drive unit 30 drives the linear motor 31 to move the wire rod 25 leftward, thereby bringing the wire rod 25 into contact with a distal end of the grown form CB in the drawing direction as shown in chain double-dashed lines in FIG. 2A. At this time, a part of the grown form CB adheres to the wire rod 25 with the viscosity of the grown form CB. Subsequently, when the drive unit 30 drives the linear motor 31 to move the wire rod 25 rightward as shown by a solid line in FIG. 2A, the grown form CB is drawn into a band-shaped sheet CS, in which the carbon nanotubes CT are agglomerated by intermolecular force and to be aligned in the drawing direction.

Figure 2B:
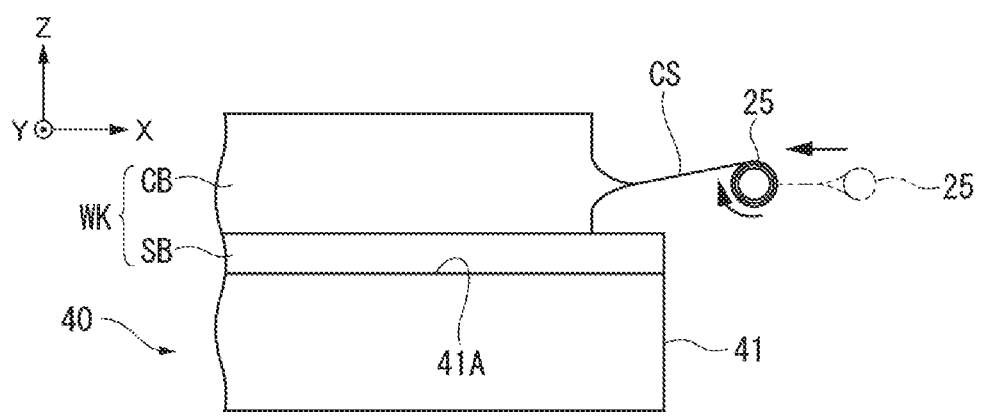
FIG. 2B is another illustration showing the operation of the drawing apparatus shown in FIGS. 1A and 1B.
Figure 2C:
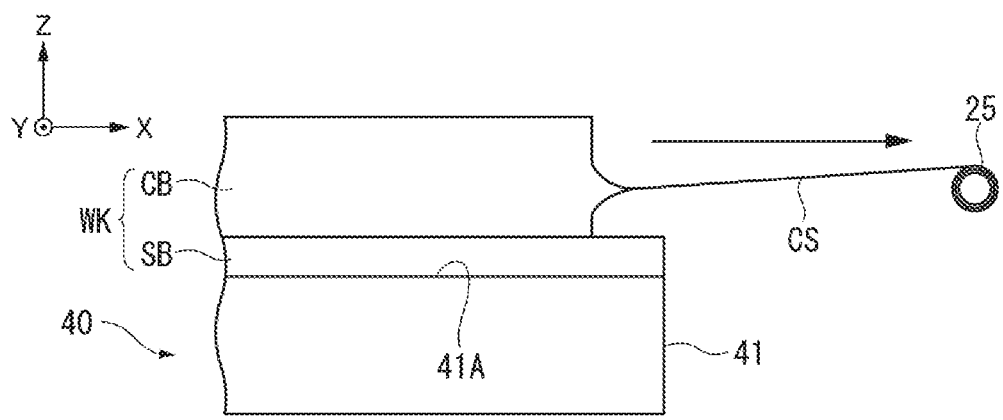
FIG. 2C is still another illustration showing the operation of the drawing apparatus shown in FIGS. 1A and 1B.

Next, the holder 20 and the drive unit 30 drive the rotary motors 22 and the linear motor 31, respectively, to move the wire rod 25 leftward as shown in FIG. 2B while rotating the wire rod 25, thereby winding the sheet CS (i.e. a part of the grown form CB) around the wire rod 25. Then, the drive unit 30 drives the linear motor 31 to draw the sheet CS again from the grown form CB as shown in FIG. 2C.

When the distal end of the sheet CS in the drawing direction reaches a non-illustrated pickup unit such as a winding unit for winding the sheet CS and a cutter for cutting the sheet CS, the holder 20 drives the linear motor 23 to transfer the sheet CS to the pickup unit using the wire rod 25. After the drive unit 30 drives the linear motor 31 to move the wire rod 25 above a non-illustrated collecting unit (e.g. box and bag), the holder 20 drives the linear motors 23, 21 to release the wire rod 25, thereby dropping the wire rod 25 into the non-illustrated collecting unit. Subsequently, when all or a predetermined amount of the grown form CB on the substrate SB is drawn into the sheet(s) CS, the grown-form support 40 stops the non-illustrated decompressor to stop sucking and holding of the integrated workpiece WK (substrate SB). Then, the non-illustrated transfer device supports and collects the integrated workpiece WK (substrate SB). When another wire rod 25 is placed between the pair of chuck members 24 by the operator or a non-illustrated transfer unit (e.g. multi-joint robot), the holder 20 drives the linear motors 23, 21 to support the wire rod 25 with the chuck members 24. Then, after the drive device of each of the units is driven to return the corresponding component to the initial position, the same operations as described above are repeated.

According to the above exemplary embodiment, since a part of the grown form CB is wound on the wire rod 25 to be held, the part of the grown form CB can be reliably held in forming the sheet CS.

Though the best arrangement, process and the like for implementing the invention are disclosed as described above, the scope of the invention is not limited thereto. In other words, while the invention has been specifically explained and illustrated mainly in relation to a particular embodiment, a person skilled in the art could make various modifications in terms of shape, material, quantity or other particulars to the above described embodiment without deviating from the technical idea or any object of the invention. The description limiting the shapes and the materials disclosed above is intended to be illustrative for easier understanding and not to limit the invention. Hence, the invention includes the description using a name of component without a part of or all of the limitation on the shape and the material etc.

For instance, in some exemplary embodiments, the holding member is a string, round bar, square bar, wire, blade material or the like and is made of metal, wood, glass, porcelain, rubber, resin, sponge or the like.

In some exemplary embodiments, the holding member is configured to helically wind a part of the grown form CB.

In some exemplary embodiments, the holder 20 directly supports the wire rod 25 with the pair of sliders 23A or, alternatively, support the wire rod 25 using a chuck unit such as a mechanical chuck and chuck cylinder, a mechanism using Coulomb's force, adhesive, pressure-sensitive adhesive, adhesive sheet, magnetic force or Bernoulli adsorption, a drive device or the like.

In some exemplary embodiments, the wire rod 25 is cantilevered by a single linear motor 23.

In some exemplary embodiments, the linear motors 23 are not necessarily provided. In this case, the wire rod 25 is, for instance, directly supported by the output shaft 22A of each of the rotary motors 22.

In some exemplary embodiments, the holder 20 is configured to rotate the wire rod 25 to wind a part of the grown form CB around the wire rod 25 in the state shown by the chain double-dashed line in FIG. 2A (i.e. with the wire rod 25 being in contact with the distal end of the grown form CB in the drawing direction).

Figure 3A:
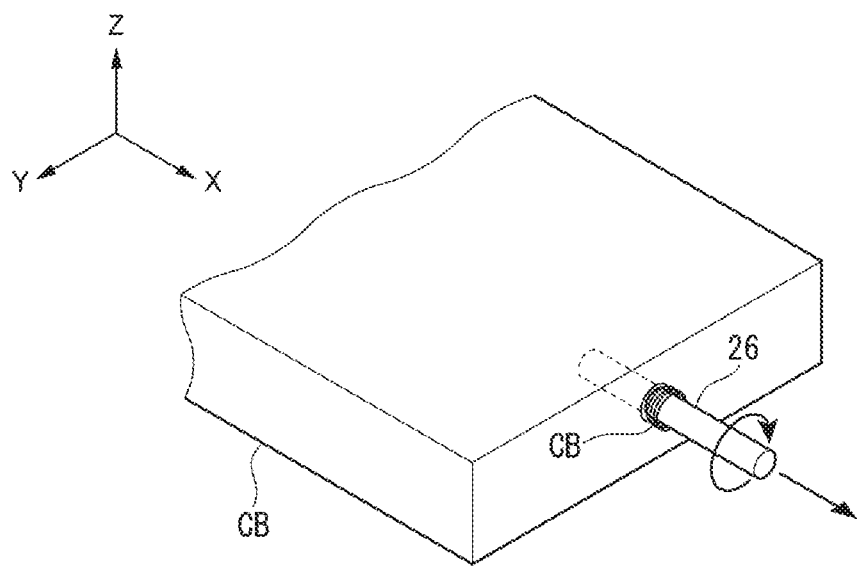
FIG. 3A is a partial perspective view showing a drawing apparatus according to a modification of the invention.
Figure 3B:
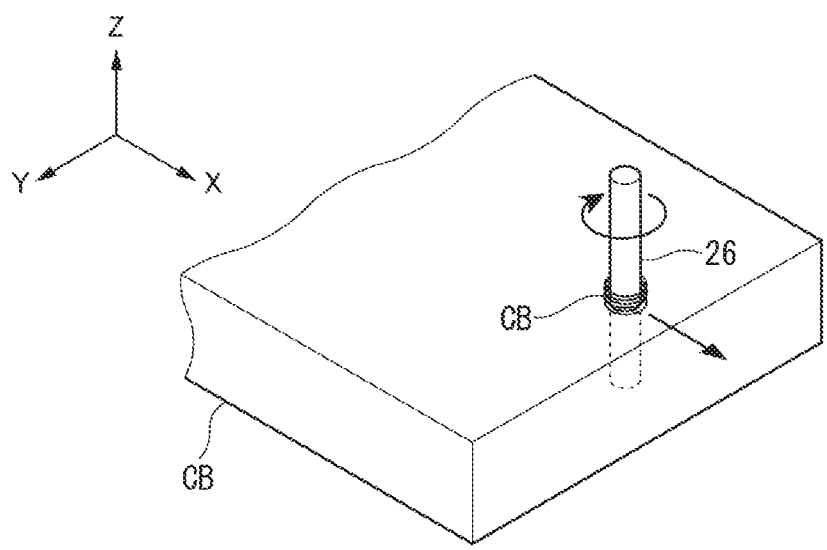
FIG. 3B is a partial perspective view showing a drawing apparatus according to another modification of the invention.

In some exemplary embodiments, the holder 20 is configured to insert a wire rod 26 (holding member) into the grown form CB in right-left direction or up-down direction as shown in FIGS. 3A and 3B or in other directions and to rotate the wire rod 26 to wind a part of the grown form CB. In this case, for instance, the wire rod 26 is optionally cantilevered by the output shaft 22A of the rotary motor 22 or the slider 23A of the linear motor 23, and the holder 20, the drive unit 30 and the like are oriented in appropriate directions so that the wire rod 26 extends in the desired direction.

In some exemplary embodiments, the holder is configured to move the wire rod 25 or 26 along the surface of the grown form CB while the wire rod 25 or 26 is in contact with the surface of the grown form CB at an outer circumferential surface thereof and is rotated around the axis thereof, thereby winding a part of the grown form CB around the wire rod 25 or 26.

The linear motor 21 is not necessarily provided.

To wind the sheet CS around the wire rod 25 or 26, the drive unit 30 moves the wire rod 25 or 26 in any of the right-left, up-down and front-rear directions and/or directions intersecting the right-left, up-down and front-rear directions in some exemplary embodiments, or is configured not to move the wire rod 25 or 26 in any of these directions.

In some exemplary embodiments, the drive unit 30 is configured to move the table 41 with the wire rod 25 being fixed, or alternatively move both of the wire rod 25 and the table 41.

In some exemplary embodiments, the drive unit 30 moves the wire rod 25 or 26 in any of the right-left, up-down and front-rear directions and/or directions intersecting the right-left, up-down and/or front-rear directions.

In some exemplary embodiments, the grown-form support 40 directly holds the grown form CB on the holding surface 41A.

In some exemplary embodiments, the grown-form support 40 supports the integrated workpiece WK and the grown form CB using a chuck unit such as a mechanical chuck and chuck cylinder, a mechanism using Coulomb's force, adhesive, pressure-sensitive adhesive, adhesive sheet, magnetic force or Bernoulli adsorption, and a drive device.

In some exemplary embodiments, the drawing apparatus 10 is configured to clean the used wire rod 25 with a cleaning device such as a brush, blade and spray nozzle so that the wire rod 25 is reusable after the sheet CS is transferred to the non-illustrated pickup unit, or uses the used wire rod 25 again without transferring the wire rod to the collecting unit or the cleaning device.

In some exemplary embodiments, the extended form is thread bundles of carbon nanotubes.

The invention is by no means limited to the above units and processes as long as the above operations, functions or processes of the units and processes are achievable, still less to the above merely exemplary arrangements and processes described in the exemplary embodiment. For instance, any drive unit within the technical scope at the time of filing the application is usable as long as the drive unit is capable of relatively moving the grown form and the holder (explanation for other units and processes will be omitted).

In some exemplary embodiments, the drive device in the above exemplary embodiment is provided by: motorized equipment such as a rotary motor, linear movement motor, linear motor, single-spindle robot and multi-joint robot; an actuator such as an air cylinder, hydraulic cylinder, rodless cylinder and rotary cylinder; or a direct or indirect combination thereof (some of the drive devices overlap with the exemplified drive devices in the exemplary embodiment).

The invention claimed is:

1. A method for using a drawing apparatus for drawing an extended form from a grown form produced by growing carbon nanotubes, the drawing apparatus comprising: a holding member configured to hold a part of the grown form; a drive unit configured to cause a relative movement of the grown form and the holding member to draw the extended form from the grown form; and a winding unit configured to wind a part of the drawn extended form around the holding member, the method comprising:

moving one of the grown form and the holding member closer to another of the grown form and the holding member to hold the part of the grown form with the holding member;

after holding the part of the grown form, moving the one of the grown form and the holding member away from the another of the grown form and the holding member to draw the extended form from the grown form, winding the part of the drawn extended form around the holding member while moving the one of the grown form and the holding member toward the another of the grown form and the holding member, with drawing the extended form stopped; and after winding the part of the drawn extended form around the holding member, moving the one of the grown form and the holding member away from the another of the grown form and the holding member to redraw the drawn extended form.

2. The method according to claim 1, wherein the winding unit is configured to wind the part of the drawn extended form around the holding member by rotating the holding member around an axis in a direction orthogonal to a drawing direction of the extended form.

3. A method of drawing an extended form from a grown form produced by growing carbon nanotubes, the method comprising:

moving one of the grown form and a holding member closer to another of the grown form and the holding member to hold a part of the grown form with the holding member;

after holding the part of the grown form, moving the one of the grown form and the holding member away from the another of the grown form and the holding member to draw the extended form from the grown form, winding a part of the drawn extended form around the holding member while moving the one of the grown form and the holding member toward the another of the grown form and the holding member, with drawing the extended form stopped; and after winding the part of the drawn extended form around the holding member, moving the one of the grown form and the holding member away from the another of the grown form and the holding member to redraw the drawn extended form.

4. A method of drawing an extended form from a grown form produced by growing carbon nanotubes, the method comprising:

moving one of the grown form and a holding member closer to another of the grown form and the holding member to hold a part of the grown form with the holding member;

winding the part of the grown form around the holding member; and moving the one of the grown form and the holding member away from the another of the grown form and the holding member to draw the extended form from the grown form.

5. The method of drawing an extended form according to claim 4, wherein the winding the part of the grown form comprises rotating the holding member around an axis in a direction orthogonal to a drawing direction of the extended form.

* * * * *